UNITED STATES PATENT OFFICE.

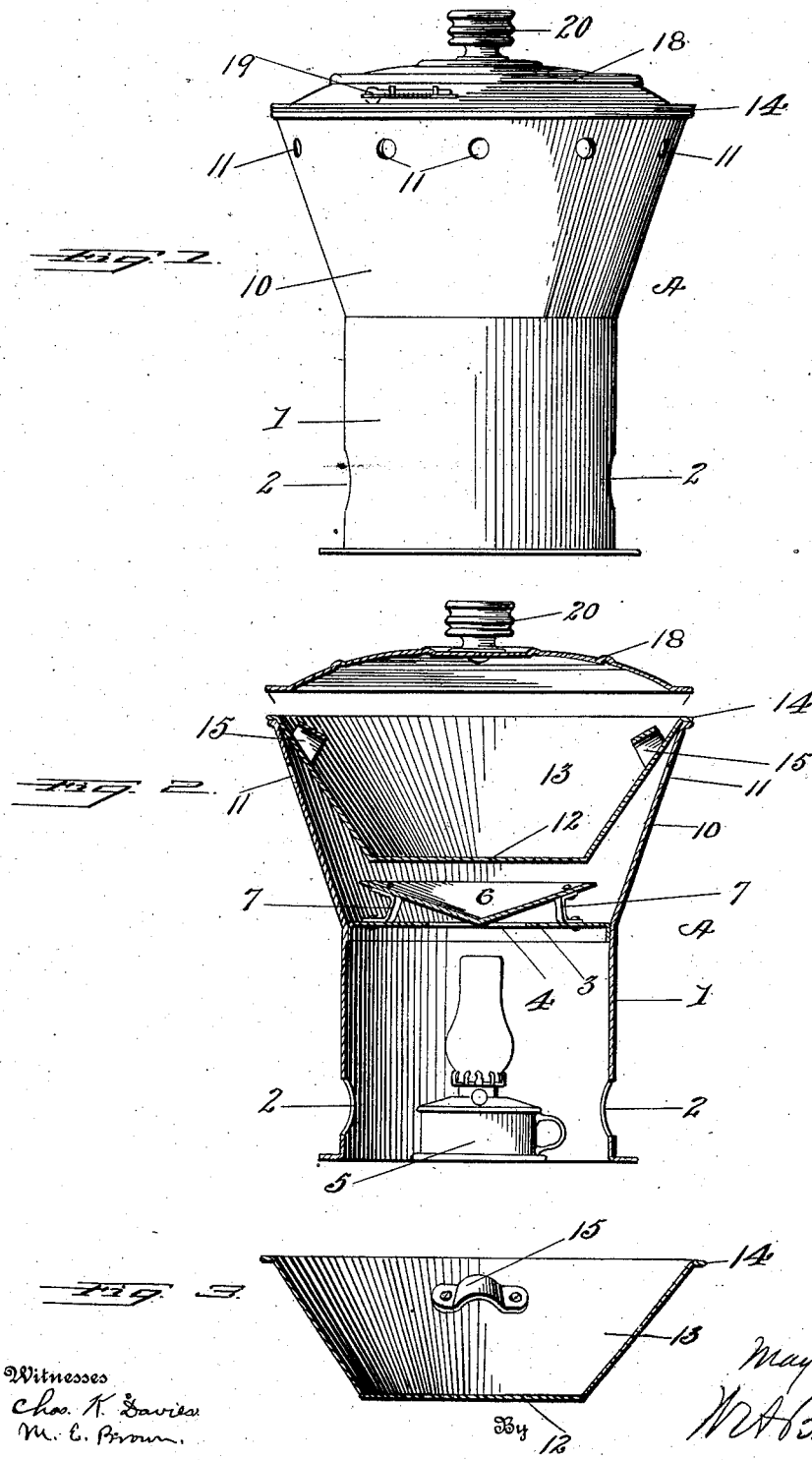

MAY BURGESS, OF GREEN BAY, WISCONSIN.

DOUGH-RAISER.

No. 850,815.  Specification of Letters Patent.  Patented April 16, 1907.

Application filed January 20, 1906. Serial No. 296,985.

*To all whom it may concern:*

Be it known that I, MAY BURGESS, a citizen of the United States, residing at Green Bay, in the county of Brown and State of Wisconsin, have invented certain new and useful Improvements in Dough-Raisers, of which the following is a specification, reference being had therein to the accompanying drawings.

This invention relates to heaters especially intended to raise bread by means of the heat of a lamp.

The invention consists in certain constructions and combinations, substantially as hereinafter pointed out and claimed.

Figure 1 is a side elevation of the heater with cover in place for use. Fig. 2 is a vertical central section with cover slightly lifted. Fig. 3 is a central section of pan at a right angle to the position of the pan in Fig. 2.

The casing A is of sheet metal, preferably tinned. The lower portion 1 is a hollow cylinder having side openings 2 2 for the admission of air. This cylindrical portion of the casing is bottomless, as shown in Fig. 2. A horizontal transverse partition 3 above the cylindrical portion of the casing has a central opening 4. A lamp 5 is placed in the casing below said opening 4 when the heater is in use. A deflecting-cone 6 is supported above the opening 4 in the partition 3 by legs 7 7 or other suitable means. The point of this cone is directly over the lamp, and its outer edge comes nearly to the inside of the casing. Above the cylinder 1 there is a flared portion 10 of the casing, and near the top of this flared portion there are a unmber of holes 11.

The bread-pan has a flat bottom 12 and a flared or frusto-conical portion 13, constituting the sides of the pan. The wired or turned-over edge 14 of this pan neatly fits and rests on the top of flared portion 10 of the casing. The pan is not as deep as the flared portion of the casing, and the taper of the pan is more rapid. Thus when the pan is in place in the casing, as shown in Fig. 2, there is a space below the pan and above the cone 6 and also an annular tapering space or chamber around the sides of the pan. The handles 15 15 of the pan are applied to the inside thereof, so that they may be readily reached to lift the pan and may not interfere with the application of the pan to the casing or of the cover to the pan. A cover 18 neatly fits the pan. This cover may have a thermometer 19 suitably attached, so as to indicate with approximate accuracy the temperature within the pan. A handle 20 serves to lift the cover from the pan.

When the parts are in operative position, with lamp 5 lighted, the hot air from the lamp rises through holes 4 and is deflected by cone 6, so that it rises against the sides of the pan. Direct radiation of heat from the cone 6 reaches the bottom of the pan. Heat rising round the sides of the pan may escape through holes 11 to prevent excess of heat round the pan. Fresh air enters the casing through holes 2 and is heated by the lamp.

What I claim is—

1. A bread-raiser, consisting of a bottomless sheet-metal casing having a cylindrical base with side openings therein, a partition above this cylindrical part of the casing and having a central opening, a deflecting-cone above said opening, a flared section of the casing above said base, and a flared pan having its outer edge resting on the upper edge of the casing.

2. A bread-raiser consisting of a sheet-metal casing with cylindrical base and outwardly-flared upper section, a horizontal partition between the sections having a central opening and a deflecting-cone above said opening, a flared pan in the upper section of the casing and resting on the edge thereof, handles on the interior of the flared pan, and a cover to said pan.

In testimony whereof I affix my signature in presence of two witnesses.

MAY BURGESS.

Witnesses:
 T. P. SILVERWOOD,
 LILL WEIDNER.